March 3, 1953     S. W. POTEET     2,630,174
METHOD OF AND MEANS FOR CUTTING TUBING
Filed Dec. 7, 1948     3 Sheets-Sheet 1

INVENTOR.
STEPHEN W. POTEET.
BY
ATTORNEY.

March 3, 1953 S. W. POTEET 2,630,174
METHOD OF AND MEANS FOR CUTTING TUBING
Filed Dec. 7, 1948 3 Sheets-Sheet 2
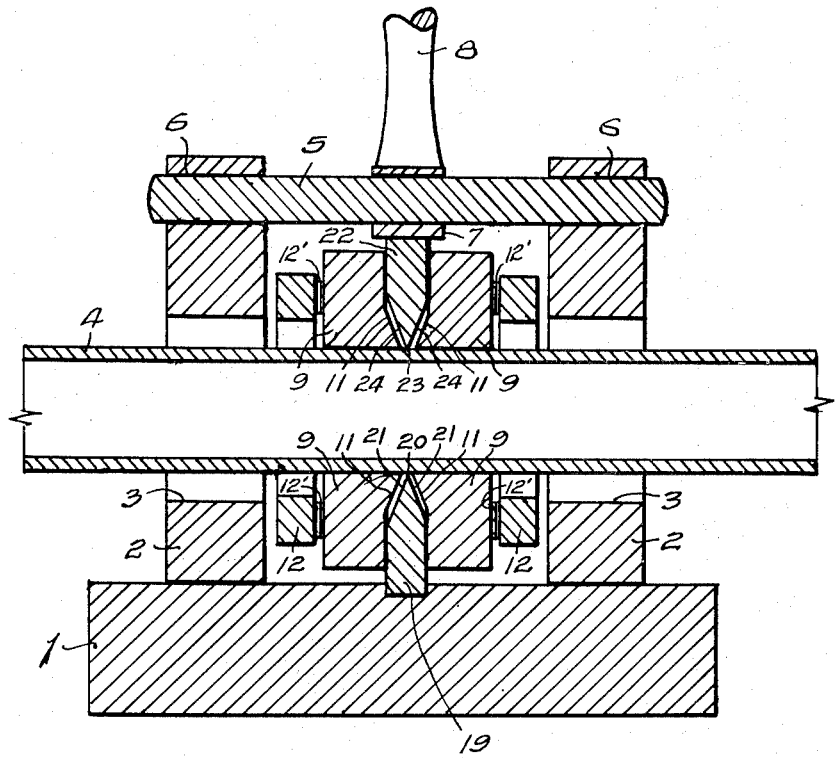
FIG. 3.
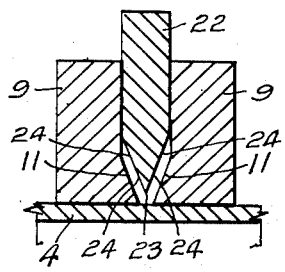 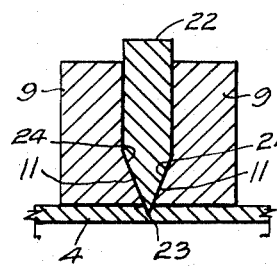 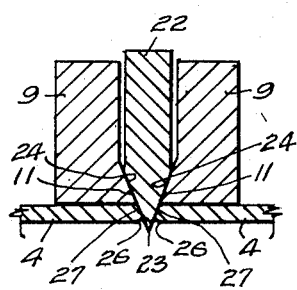
FIG. 4.     FIG. 5.     FIG. 6.
INVENTOR.
STEPHEN W. POTEET.
BY
ATTORNEY.

March 3, 1953 S. W. POTEET 2,630,174
METHOD OF AND MEANS FOR CUTTING TUBING
Filed Dec. 7, 1948 3 Sheets-Sheet 3

INVENTOR.
STEPHEN W. POTEET.
BY
ATTORNEY.

Patented Mar. 3, 1953

2,630,174

UNITED STATES PATENT OFFICE 2,630,174

METHOD OF AND MEANS FOR CUTTING TUBING

Stephen W. Poteet, Lemay, Mo.

Application December 7, 1948, Serial No. 63,863

2 Claims. (Cl. 164—17)

This invention relates to a method of and means for severing metal tubing.

The object of the invention is to provide an improved method of and means for severing metal tubing into desired lengths, without unduly distorting the walls of the tubing being cut, without any material waste of tube material such as when cutting the tubing with a saw, and whereby the cut ends of the tubing are left with a radius at the edge of the inside wall to eliminate internal burrs, which is economically essential when the cut lengths of tubing are used for electrical and similar work where the edge of the inside wall of the tubing must be free from burrs or a sharp edge.

A further object of the invention is in providing the radius at the edge of the inside wall at the time of cutting of the tubing, which eliminates the operation of reaming and/or countersinking as is now required for making connections requiring a seat to be used at the edge of the inner wall of the tubing.

This invention has for its object an improved method of and means for severing a metal tube which is accomplished by subjecting the tube to an opposed piercing action for partially cutting through the wall of the tube, and, by subjecting the tube to a longitudinal tension produced by a wedging action for finally severing the tube without distorting the same, and to provide the edges of the inner walls of the severed ends of the tube with a radius free from burrs.

Referring to the drawings, which illustrate but one embodiment of the means for carrying out my invention:

Fig. 3 is a longitudinal sectional view of the device, showing the tube in clamped position and the cutter members in starting contact with the wall of the tube.

Fig. 4 is a diagrammatic view illustrating the clamping members clamping the tube and one of the cutter members out of contact with the wall of the tube before being moved into starting contact with the wall of the tube, as shown in Fig. 3.

Fig. 5 is a diagrammatic view similar to Fig. 4, illustrating the arcuate cutting edge of the upper cutting members midway the ends thereof as partially cutting the top portions of the outer wall of the tube.

Fig. 6 is a diagrammatic view similar to Figs. 4 and 5, showing the top of the curved cutting edge of the top cutting member as having completely passed through the wall of the tube after having set up a wedging against the clamping members for subjecting the wall of the tube to a longitudinal tension stress for finally severing the tube by partially cutting transversely and by a pulling action on the tube.

Figure 7:
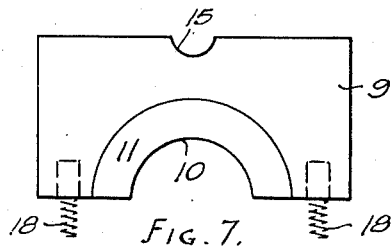

Fig. 7 is an inner side elevation of one of the tube clamping members.

Figure 8:
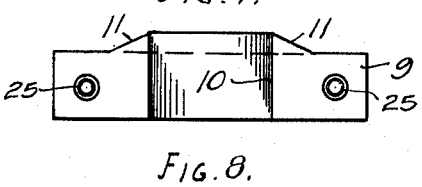

Fig. 8 is a bottom plan view of the member shown in Fig. 7.

Figure 9:
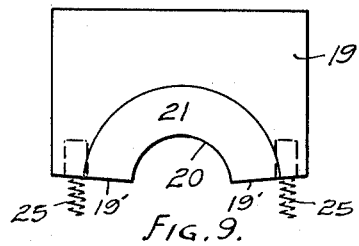

Fig. 9 is a side elevation of one of the two tube cutting members showing the cutting edge radius and the chip clearance on opposite sides.

Figure 10:
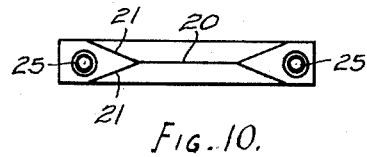

Fig 10 is a bottom plan view of the member shown in Fig. 9, clearly showing the cutting edge thereof.

Figure 11:
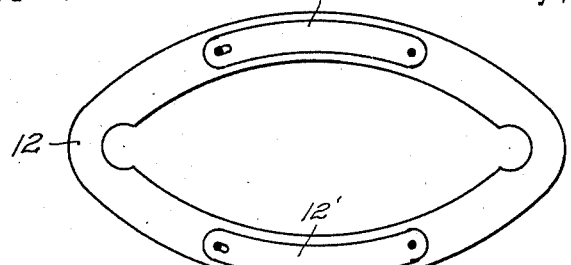

Fig. 11 is a side elevation of one of the links co-acting with the tube clamping members.

Figure 12:
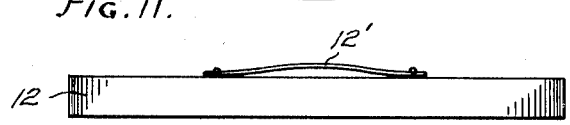

Fig. 12, is a plan view of the link shown in Fig. 11.

Figure 13:
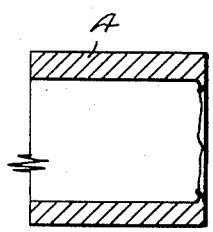

Fig. 13 is a fragmentary view of a cut tube in longitudinal sectional elevation and showing burrs at the edge of the cut end of the tube as is usual when sawing the tube to sever the same.

Figure 14:
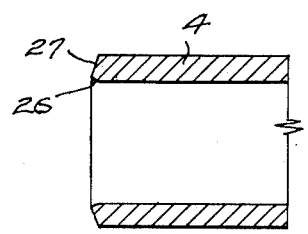

Fig. 14 is a fragmentary view of a tube cut by my improved method and means and showing a radius at the edge of the inner wall and a slight angle for the end face of the tube.

In the drawings forming a part hereof, which illustrate one embodiment only of a means or device for carrying out my improved method of severing metal tubing, the reference character 1 designates a base plate provided with a pair of suitably spaced upright members 2 which may be suitably supported by and secured to the base plate 1, or, if desired, they may be integral parts with the base plate 1. The uprights 2 are each provided with an opening 3 which openings are in alignment so as to allow for the passing of a tube therethrough to be severed by partially cutting transversely and longitudinal pulling. The openings 3 are of greater diameter than the outside diameter of the tube to be severed, so as to allow clearance between the wall of a tube 4 to be severed and the walls of the openings 3.

A suitable shaft 5 spans the gap between the two uprights 2 and the ends of the shaft 5 are rotatably mounted in suitable bearing openings 6 in the upper end portions of the uprights 2. A suitable cam member 7 is securely carried by the shaft 5 and a suitable handle, or lever 8 projects from the cam member for actuating the shaft and cam.

Figure 1:
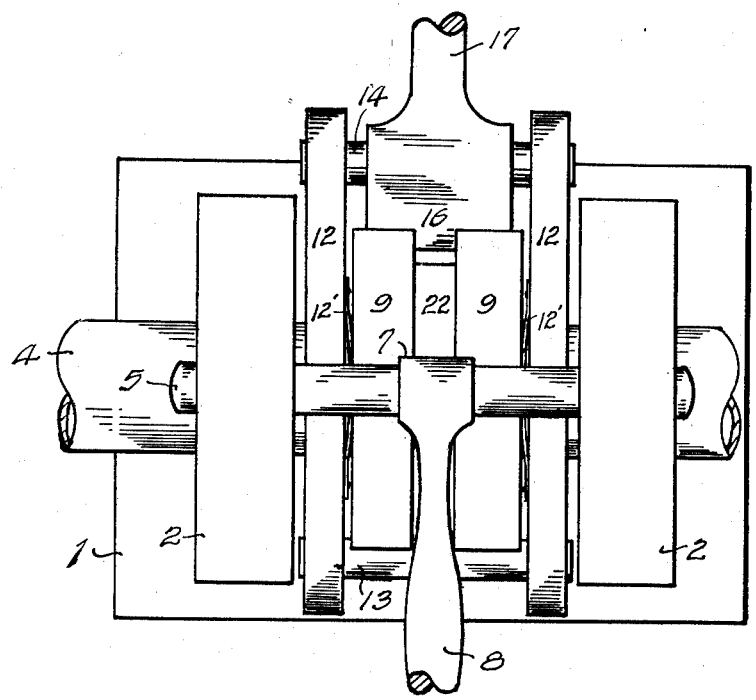
Fig. 1 is a top plan view of the tube cutting device in its closed position and showing the tube operated upon.
Figure 2:
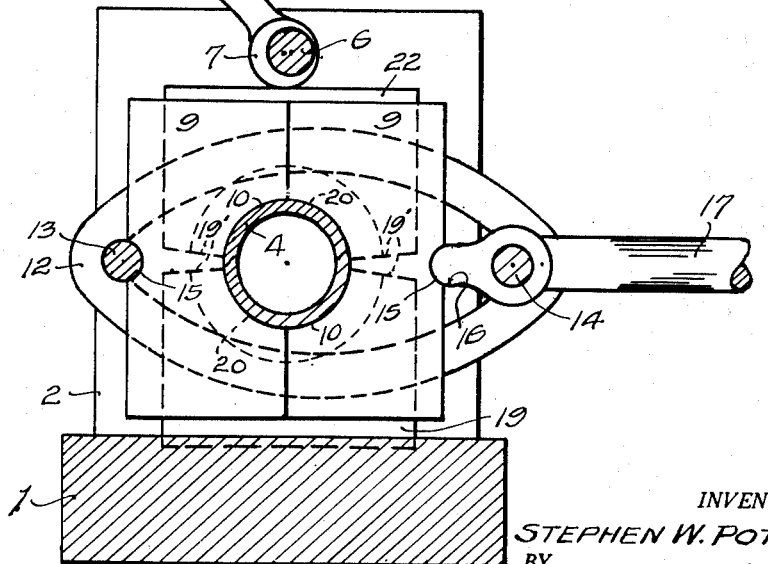
Fig. 2 is a transverse sectional view of the device.

The reference character 9 designates a pair of tube clamping or gripping members having semicylindrical cut-outs 10 for gripping contact with the outer wall of tube 4 to hold it in position to be severed. The radius of each cut-out 10 must be smaller than the radius of the outside diameter of the tube to be severed so that the grippers 9 will grip tight enough to hold the wall of the tube in place to eliminate slipping of the grippers on the tube when wedging action is applied to the grippers. Portions of the inner side faces of the clamping members 9 are each provided with like beveled faces 11 bounding the cutouts 10, as shown in Fig. 8. The clamping members 9 are arranged vertically between a pair of suitably shaped links 12, the ends of which are mounted on a pair of cross-pins designated 13 and 14, as shown in Figs. 1 and 2. Each link has a pair of bowed spacer springs 12' secured to their inner faces, as shown in Figs. 3, 11 and 12, to yieldingly engage the outer side walls of the clamping members to normally hold said members in contact with the side faces of tube cutters hereinafter described. The tube clamping members 9 are provided on their outer side faces with a suitable bearing recess 15.

The bearing recess 15 on one of the clamping members 9 is supported by the link supporting pin 13. The bearing recess 15 on the other clamping member 9 is adapted to be engaged by the free end face of a suitable cam member 16 carried by the link supporting pin 14. The cam member 16 is actuated by a lever 17 to engage and disengage the cam member 16 with the recess 15 on one of the clamping members 9. When the lever 17 is moved to one position, as shown in Fig. 2, the cam member 16 forces the adjacent clamping member 9 towards the other clamping member 9 so that both clamping members 9 will firmly clamp, or grip the tube 4 to be cut. When the lever 17 has been raised or lowered with respect to the position shown in Fig. 2, the cam member 16 releases pressure against one of the tube clamping members 9, thus releasing clamping pressure around the tube 4 by allowing one of the clamping members 9 to be moved away from the tube 4 due to the action of a pair of suitable expansion springs 18 that are suitably supported by and carried between the clamping members 9.

A stationary tube cutting member 19 having a suitable arcuate cutting edge 20 with tapered side walls 21 is suitably anchored to the base 1, as clearly shown in Fig. 3, preferably midway between the tube clamping members 9. A second tube cutting member designated 22 having an arcuate cutting edge 23 with tapered side walls 24 is arranged for vertical movement above the stationary cutter 19 and is normally separated therefrom by suitable springs 25 interposed between the cutters 19 and 22. The radius of the cutting edge of each of the cutters should be the same and slightly greater than the inside diameter of the tube to be severed and less than the outside diameter of the tube to prevent cutting through the inner wall of the tube.

The upper face of the vertically movable cutter 22 is positioned for constant contact with the cam 7 which is actuated by means of the lever arm 8.

When the lever arm 8 is in the position shown in Fig. 2, the movable cutting member 22 will have been moved downwardly sufficiently to cause the cutting edge 23 to have partially cut the upper half portion of the tube 4, while the lower half portion of the tube 4 will have been correspondingly cut by the cutting edge 20 of the stationary cutting member 19. Further downward movement of the lever arm 8 will cause the cam 7 to force the cutting member 22 downwardly causing the cutting edge 23 thereof to progressively further cut a portion of the side portions of the outer wall of the tube 4, and simultaneously therewith cutting edge 20 of the stationary cutting member 19 will correspondingly cut a portion of the side portion of the outer wall of the tube 4 before the final severance of the tube 4, by causing the cutting member 22 to be moved into contact with the cutting member 19. The opposed inner faces 19' of the cutters 19 and 22 diverge from opposite sides, thereby providing chip clearance spaces when the movable cutting member 22 at the ends of the cutting edge 23 comes into contact with the ends of the cutting edge 20 of the stationary cutting member 19. The radii of the cutting edges of the cutters are slightly greater than the interior diameter of the tube being cut to prevent the cutting of the inner wall of the tube, thus eliminating any possible chance of a sharp edge or burrs to be formed at the edge of the inner wall of the severed tube.

After a tube 4 has been positioned between the clamping members and the cutters are in their inoperative or open position, movement of the lever arm 17 to the position shown in Fig. 2 causes the cam 16 to move the tube clamping members 9 to firmly grip and compress the tube 4 into position for shearing. The links 12 and clamping members 9 are in reality floating members as a unit.

As will be apparent from Figs. 2 and 3, downward movement of lever 8 causes the cam 7 to exert downward pressure against the cutter 22 to cause the cutters to partially pierce the tube wall as downward movement of the lever 8 progresses which is due to the cutter 22 being moved toward the stationary cutter 19. The cutters 19 and 22 first pierce the side portions of the outside wall of the tube 4, then proceed to partially pierce the remainder of the tube wall to the point shown in Fig. 5. As the tapered side walls of the cutters continue to move against the tapered side walls of the clamping members 9, as shown in Fig. 6, they cause a progressive forcing apart of the clamping members 9, and, it is this wedging action which spreads the clamping members apart to longitudinally stretch the inner wall of the tube leaving a radius 26 at the severed ends of the tube instead of a sharp edge or burrs as is now common with present known methods of mechanically cutting tubes. The tube severing operation is as follows:

When a tube 4 is laid upon the lower stationary cutting member 19, and the upper movable cutting member 23 is moved to contact the outer wall of the tube, the sharp V-shaped free ends of the arcuate cutting edges 20 and 23 of the lower and upper cutting members 19 and 22, respectively, engage the outer wall of the tube on opposite sides thereof at points below and above the transverse axis of the tube and in a vertical line slightly outside the diameter of the inner wall of the tube. Thus, as the cutting member 22 moves toward cutting member 19, the V-shaped ends of the arcuate cutting edges 20 and 23 will first cut the side portions of the wall of the tube, and, when the V-shaped ends of the cutting edges of the two cutting members meet or contact each other, the wall material corresponding to the V-shaped ends of the cutting edges of the cutting members 19 and 22 will be cut, or removed from the side portions of the tube wall in the form of chips. These chips, however small, are received in the outwardly diverging clearance spaces between the inner ends of the cutting members on opposite sides of a tube 4. The radii on the rest of each of the cutters start to pierce the remaining portions of the outer wall of the tube after the V-shaped ends of the cutting edges have started, and, as they do, the tapered walls of the cutters contact the tapered walls of the grippers creating a strain causing the grippers to move until the entire tube wall is weakened to the point that it will pull, or tear the remaining part of the tube apart. This pulling, or tearing apart of the tube stretches the weakened portion of the tube into a radius and smooth edge 26 on the inner wall of the tube which is free of burrs.

From the foregoing description, it will be apparent that my method of cutting tubes is carried out by having the radii of the cutting edges of the cutters greater than the interior diameter of the tube 4 so that the cutting edges will not pierce the inner wall of the tube, and by causing a wedging action of the cutters against the beveled faces of the tube clamping members. This causes a spreading action of the clamping members at this point of the cutting operation of the cutters causing a stretching or pulling stress on the inner wall of the tube which actually provides the severed edges of the inner wall of the tube with a radius and slightly bevels the end faces of the tube, thus eliminating reaming or other operations on the cut ends of the tube as is now common, especially where the tube has been cut and is used in electrical or other work where the ends of the tube must be free from sharp edges or burrs.

The advantages of the herein described method of and means for severing metal tubing will readily suggest themselves to those skilled in the art to which it appertains, as the method as well as the means lends itself economically as well as efficiently to those working on a job away from a shop and particularly so to electrical workers laying conduits for wires in new buildings.

What I claim is:

1. In a device for severing tubing, the combination of separable tube clamping members arranged in side by side spaced relation for supporting the tube circumferentially adjacent the plane of severance, a pair of piercing members having concaved cutting edges V-shaped in cross section arranged in opposed relation between the clamping members, one of the piercing members being stationary and the other of the piercing members being movable relative thereto, and means comprising the clamping members and the piercing members for subjecting the tube to a longitudinal tension between the clamping members to finally sever the tube and effect a radius on each of the edges of the inner wall of the severed tube.

2. The method of severing a metal tube which consists in circumferentially gripping and supporting the tube at two spaced apart points, subjecting opposed sides of the wall of the upper and lower halves of the tube between the gripped portions thereof to opposed piercing action to partially sever the wall on opposite sides of the tube, and progressively with such action subjecting the non-partially severed portions of the upper and lower halves of the tube to a cutting and wedging action to partially sever the same, and progressively therewith subjecting the tube between the gripped portions thereof to longitudinal tension sufficient to completely sever the tube by pulling the ends apart and to effect a radius on each of the edges of the inner wall of the severed tube.

STEPHEN W. POTEET.

REFERENCES CITED

The following references are of record in the file of this patent:

UNITED STATES PATENTS

| Number | Name | Date |
| --- | --- | --- |
| 667,194 | Curtin | Feb. 5, 1901 |
| 967,998 | Swan | Aug. 23, 1910 |
| 1,366,063 | Culhane | Jan. 18, 1921 |
| 2,179,581 | Voogd | Nov. 14, 1939 |
| 2,249,325 | Pruckner | July 15, 1941 |
| 2,313,793 | Wood | Mar. 16, 1943 |